United States Patent [19]

Kemp

[11] Patent Number: 5,170,659
[45] Date of Patent: Dec. 15, 1992

[54] APPARATUS AND METHOD FOR DETECTING FLUID LEAKAGE

[75] Inventor: Willard E. Kemp, Houston, Tex.

[73] Assignee: Kemp Development Corporation, Tex.

[21] Appl. No.: 682,449

[22] Filed: Apr. 8, 1991

[51] Int. Cl.$^5$ .................... G01M 3/28; G08B 1/04
[52] U.S. Cl. .................................. 73/46; 73/40; 137/312; 137/557
[58] Field of Search ........... 73/40.5 R, 46, 40, 864.65, 73/864.63; 116/272; 137/312, 557

[56] References Cited

U.S. PATENT DOCUMENTS

| | | | |
|---|---|---|---|
| 2,570,655 | 10/1951 | Druge | 137/557 |
| 3,592,218 | 7/1971 | Guy et al. | 137/557 X |
| 3,656,498 | 4/1972 | Grove et al. | 137/312 X |
| 3,952,691 | 4/1976 | Peltz et al. | 137/557 X |
| 4,461,316 | 7/1984 | Cove et al. | 137/312 |
| 4,499,846 | 2/1985 | Bergeron et al. | 137/557 X |
| 4,840,195 | 6/1989 | Zabrenski | 137/312 |
| 4,874,007 | 10/1989 | Taylor | 73/40.5 R X |
| 4,951,697 | 8/1990 | Fritts | 137/557 |

Primary Examiner—Hezron E. Williams
Assistant Examiner—Michael Brock
Attorney, Agent, or Firm—Dodge, Bush, Moseley & Riddle

[57] ABSTRACT

Apparatus and method for detecting fluid leakage into an enclosed leakage chamber or space sealed by a fluid seal exposed to pressurized fluid from a flow line or pressure vessel. Upon leakage of fluid from the flow line or pressure vessel past the seal into the leakage chamber or space, the leaked fluid is communicated to a piston chamber in a fluid indicator device. Upon the reaching of a predetermined high fluid pressure, the piston is actuated for extending an indicator rod of the fluid indicator into a projected position for visual observation. For testing or inspection of the leaked fluid, a separate removable adaptor is provided for moving the piston to a fluid bypass position to permit removal of fluid from the piston chamber containing the leaked fluid, or to permit injection of an external fluid such as a sealant into the piston chamber and leakage chamber.

31 Claims, 3 Drawing Sheets

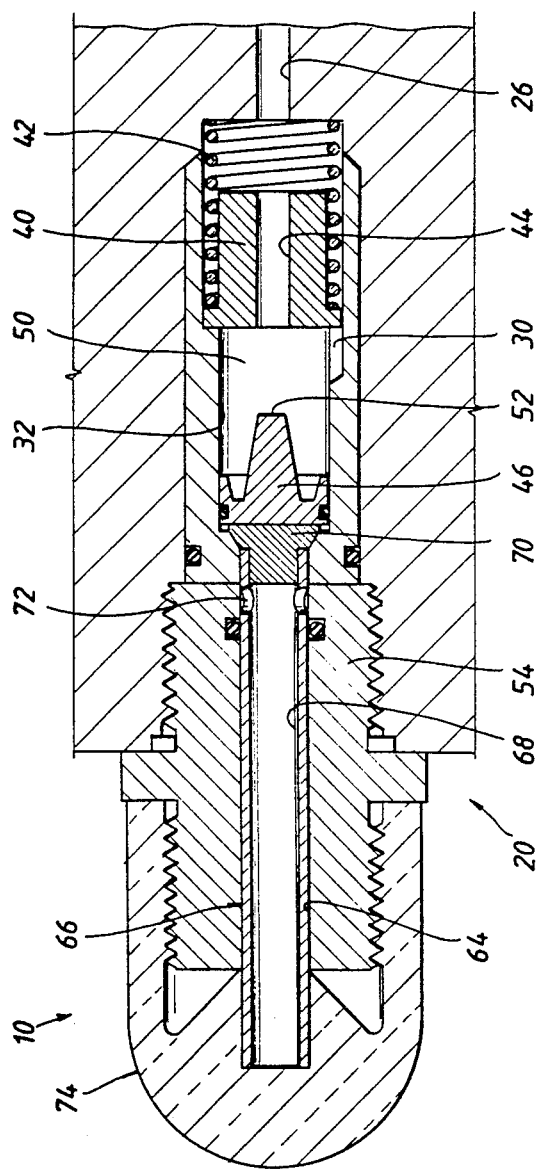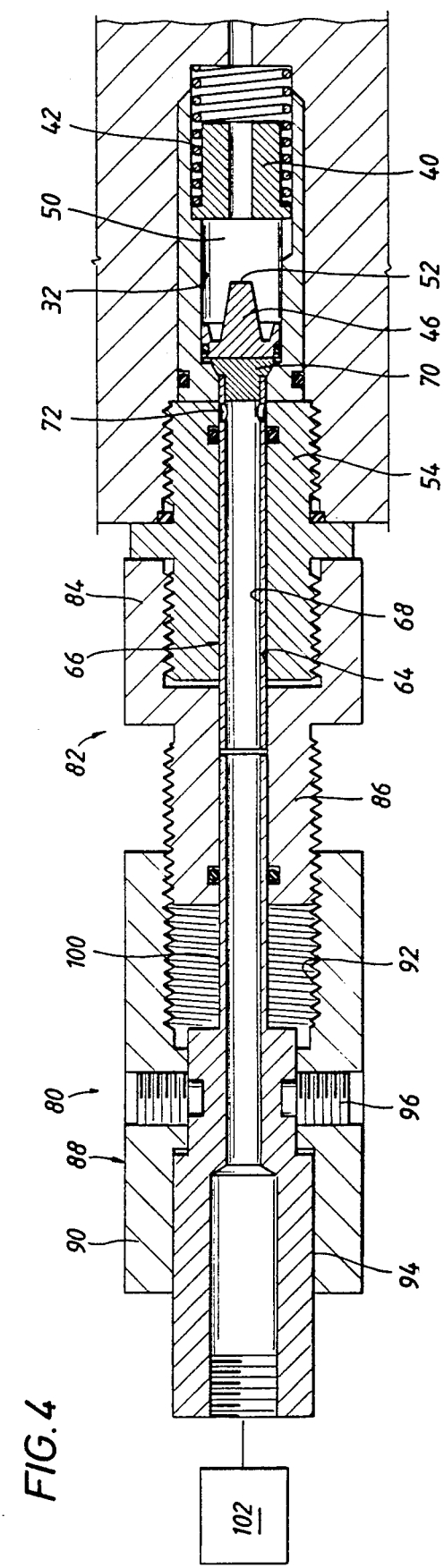

APPARATUS AND METHOD FOR DETECTING FLUID LEAKAGE

FIELD OF THE INVENTION

This invention relates to an apparatus and method for detecting fluid leakage past a fluid seal into an enclosed leakage chamber sealed by the fluid seal, and particularly a fluid seal, such as a packing or elastomer ring, in fluid communication with a flow line or a pressure vessel.

BACKGROUND OF THE INVENTION

Heretofore, various types of signal devices or apparatus have been utilized to detect an undesirable predetermined high or predetermined low fluid pressure in fluid lines or fluid apparatus for pressure vessels. Such signal devices have included, for example, visually observable signals, as well as audible signals, or electronically transmitted signals to a remote location. Corrective action may follow the indication or detection of an undesirable fluid pressure.

Visual indicators heretofore have, for example, utilized extendible rods with brightly colored outer ends, such as red, which are extended for observation into a visible area when a predetermined high fluid pressure is reached in an associated flow line or pressure vessel. However, fluid communication through the indicator with the chamber containing the leaking fluid by another device, such as a sealant injector, has not been accomplished heretofore. Normally, other separate devices not associated with the fluid indicator or detector have been provided in order to take corrective action for the leaking fluid.

SUMMARY OF THE INVENTION

The present invention is directed to an apparatus and method for detecting fluid leakage into an enclosed leakage chamber or space sealed by a fluid seal exposed to pressurized fluid from a flow line or pressure vessel. Upon leakage of fluid from the flow line or pressure vessel past the seal into the leakage chamber or space, the leaked fluid is communicated to a piston chamber in a fluid indicator device. Upon the reaching of a predetermined high fluid pressure, the piston is actuated for extending an indicator rod of the fluid indicator into a projected position for visual observation. The end of the visual indicator device has a removable transparent plastic cap and the end of the rod is colored a bright color, such as red, to provide a reddish glow or hue which is easily observable when the rod is projected. Thus, the fluid pressure may be constantly monitored with such an indicator device and leakage of fluid detected by the visual indicator. Upon a visual indication of fluid leakage past a fluid seal, action may be taken to correct or stop the leakage.

It is important with certain ladings or fluids to determine if the leaked fluid contains harmful ingredients and for that purpose it may be desirable to determine the composition of the fluid. Also, it may be desired to inject a sealant into the leakage space or chamber to stop or block the leakage. For testing or inspection of the leaked fluid, it is necessary to obtain a sample of the leaked fluid for testing. This may be accomplished by providing a fluid bypass for the piston at a particular position of the piston and then providing means for positively positioning the piston in a bypass position.

A separate removable adaptor is provided for moving the piston to a fluid bypass position after the visual indicator is actuated to indicate leaked fluid. The adaptor is threaded onto the end of the indicator device after the removal of a threaded transparent cover or cap from the end of the indicator device. The adaptor has a projecting plunger fixed to a rotatable sleeve and upon securement of the adaptor on the indicator device rotation of the sleeve effects end to end contact of the plunger with the indicator rod to push the rod and associated piston to a fluid bypass position to permit removal of fluid from the piston chamber containing the leaked fluid, or alternatively to permit injection of an external fluid into the piston chamber and leakage chamber. Thus, leaked fluid may be drained from the piston chamber or selected fluids may be injected into the piston chamber and the leakage chamber or space. For testing the composition of the leaked fluid, a chemical detection device is removably attached to the end of the adaptor and receives a quantity of leaked fluid for inspection. If desired to inject a sealant, a sealant injector is removably attached to the end of the adaptor to inject sealant into the piston chamber and thence to the chamber or space between the seals for preventing or minimizing the leakage of fluid. There is no loss of leaked fluid to atmosphere during the positioning of the adaptor and the operation of the sealant injector or chemical detection device.

It is an object of this invention to provide an apparatus and method for detecting fluid leakage into an enclosed leakage chamber sealed by a fluid seal in fluid communication with a flow line or pressure vessel.

It is another object of this invention to provide a visual indicator for indicating fluid leakage into an enclosed leakage space sealed by a fluid seal from a flow line or pressure vessel.

A further object of this invention is to provide such a visual indicator having a piston chamber for receiving the leaked fluid and means to move a piston in said chamber to a fluid bypass position in which leaked fluid may be removed from the piston chamber for inspection, or alternatively a separate fluid, such as a sealant, may be injected through the piston chamber into the enclosed leakage space for preventing or minimizing the fluid leakage.

Other objects, advantages, and features of the invention will become more apparent after referring to the following specification and drawings.

BRIEF DESCRIPTION OF THE DRAWINGS

FIG. 3 is an enlarged view of the visual indicator device of FIG. 2 but showing the indicator rod in a projected position for visual observation to indicate fluid leakage;

FIG. 4 is an enlarged view of the indicator device of FIG. 3 with the transparent end cover removed and showing an adaptor threaded onto the threaded end of the indicator device prior to movement of the piston to a fluid bypass position;

DESCRIPTION OF THE INVENTION

Figure 1:
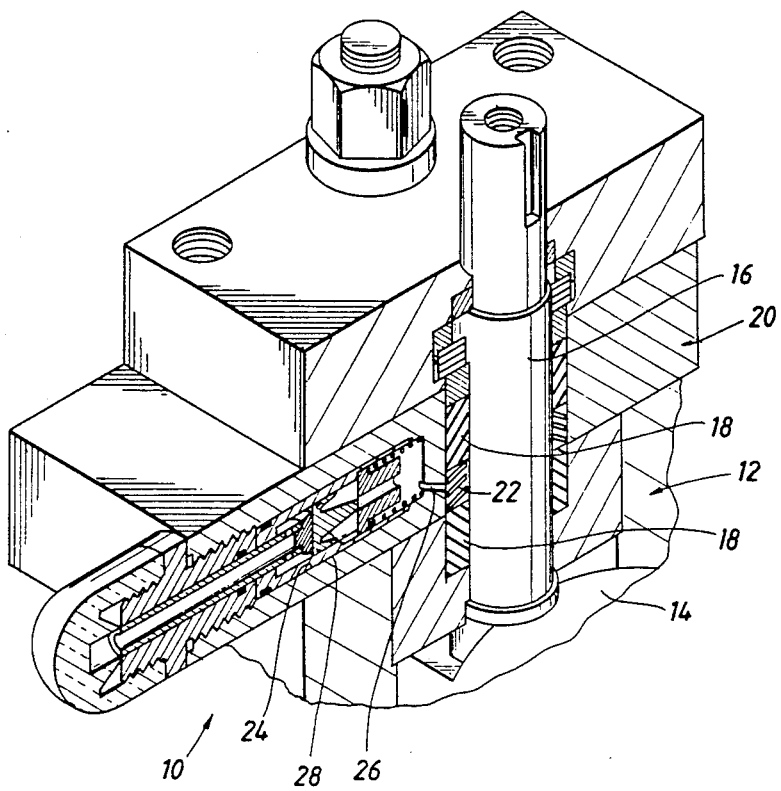
FIG. 1 is a perspective of the device for indicating fluid leakage comprising the present invention shown mounted on a ball valve body and in fluid communication with an enclosed chamber or space between two packing seals about the stem of a ball valve.
Figure 2:
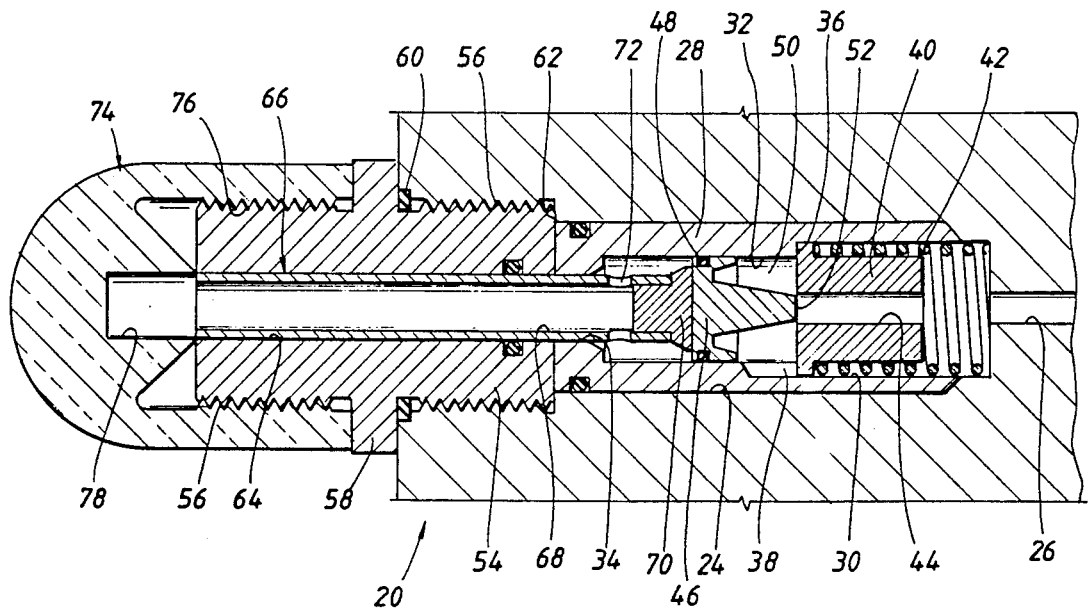
FIG. 2 is an enlarged fragment of FIG. 1 showing the visual indicator device in a normal operating position without any fluid leakage.

Referring to the drawings and particularly to the embodiment shown in FIGS. 1-5, a visual leakage indicator device is shown generally at 10 mounted on a ball valve structure generally indicated at 12 positioned in a flow line or conduit (not shown). Ball valve structure 12 includes a ball valve member 14 rotated between open and closed positions by a stem 16 which may be manually or power actuated. A pair of spaced seals or packings 18 form a chamber or space 22 therebetween and seal between stem 16 and a top cover plate 20 of the valve body. Lower seal 18 is exposed to pressurized fluid in the valve chamber from the flow line or conduit in which ball valve structure 12 is positioned. In the event of leakage or failure of lower seal 18, fluid will leak into leakage chamber 22. The upper seal may be provided by other means, such as a bellows, if desired.

Leakage indicator device 10 is positioned within a generally cylindrical bore indicated at 24 in upper cover plate 20. The inner end of bore 24 is in fluid communication with chamber 22 through an opening 26. Mounted in bore 24 adjacent its inner end is a sleeve 28 having a large diameter portion 30, an intermediate diameter portion 32, and a small diameter portion 34. An annular abutment or shoulder 36 is defined between diameter portions 30 and 32 and a slot 38 is formed in sleeve 28 to provide a fluid bypass as will be explained further hereinafter.

A guide 40 is mounted in large diameter portion 30 and is urged by spring 42 against shoulder 36. Guide 40 has a central bore 44 therethrough. A piston 46 is mounted for movement within intermediate diameter portion 32 and has an outer seal 48. Intermediate diameter portion 32 and large diameter portion 30 define a piston or inlet chamber 50. Piston 46 has an inner end 52 adjacent central bore 44 and exposed to fluid pressure from chamber 22 through opening 26 and bore 44.

An externally threaded body or casing 54 for indicator device 10 has external screw threads 56 and an outwardly extending flange 58 fitting in abutting relation against the outer surface of cover plate 20 against an elastomeric seal 60. The inner end of casing 54 abuts sleeve 28 to hold sleeve 28 in position and a central bore 64 extends through casing 54 forming a continuation of small diameter portion 34 of sleeve 28.

Mounted within central bore 64 and small diameter portion 34 is an elongate hollow indicator rod generally indicated at 66 having a central bore 68 plugged at its inner end by a plug 70 abutting the outer face of piston 46. Apertures or ports 72 extend through the wall of hollow rod 66 to provide fluid communication with bore 68. The outer end portion of indicator rod 66 is colored a bright red color for visual observation when indicator rod 66 is in a projected position resulting from fluid leakage into chamber 22. An outer transparent cover or cap generally indicated at 74 has internal threads 76 engaging external threads 56 on casing 54 and has a central opening 78 to receive the projecting end of rod 66 in the projected or extended position. Cover 74 may be easily threaded onto casing 54 against flange 58 and may be easily unthreaded from casing 54 for removal.

In operation, upon the leakage of fluid from the valve chamber past lower seal 18 into chamber 22, fluid is communicated through opening 26 into inlet or piston chamber 50 against piston 46. Upon the reaching of a predetermined fluid pressure in chamber 22, piston 46 moves outwardly from the normal operating position of FIG. 2 to the projected position of FIG. 3 in which indicator rod 66 is extended and the outer colored end of rod 66 is received within opening 78 of transparent cover 74 to provide a red glow or hue which is easily observable.

Particularly in the event of a hazardous or harmful fluid being in the associated pressure vessel or flow line, it may be desirable to determine the composition of the leaked fluid by removal of fluid from piston chamber 50 for testing. In some instances, it may be desirable to inject a sealant in piston chamber 50 for flow into chamber 22 to stop or minimize the fluid leakage past lower seal 18. For these purposes, an adaptor generally indicated at 80 is provided for threading onto the threaded end 56 of casing 54 after removal of end cover 74.

Figure 5:
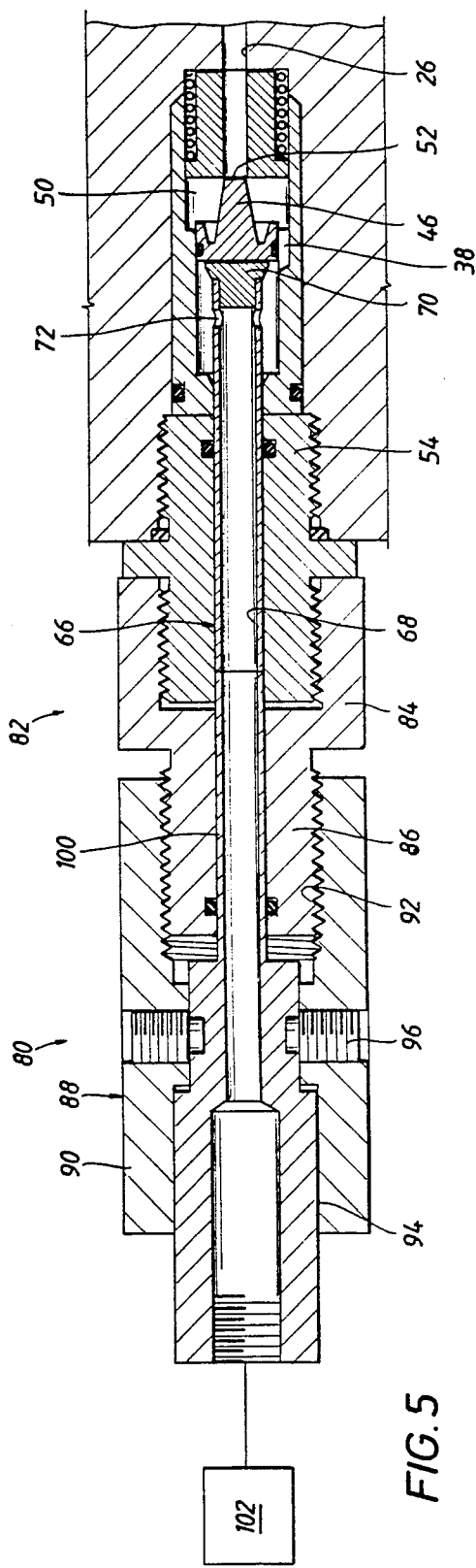
FIG. 5 is an enlarged view of the indicator device and adaptor shown in FIG. 4 but showing the plunger in a fully extended position for moving the piston to a fluid bypass position.

Adaptor 80 as shown particularly in FIGS. 4 and 5 includes a connector generally indicated at 82 having an internally threaded female end 84 and an externally threaded male end 86. Threaded onto male end 86 is a rod and piston actuator 88 having an outer tubular body or sleeve 90 with internal screw threads 92 on a female end for threading about male end 86 on connector 82. Outer tubular body 88 receives an inner body 94 secured therein by set screws 96. Inner body 94 has an outer internally threaded female end 94 and an inner projecting hollow prong or plunger 100 of generally the same dimensions as hollow indicator rod 66. Upon threading of piston actuator 88 onto male end 86, hollow plunger 100 engages the end of indicator rod 66 to push indicator rod 66 and piston 46 to the position of FIG. 5 in which piston 46 has its face adjacent slot 38 to permit a flow of fluid around piston 46 thereby to provide a fluid bypass position. In this position, actuator 88 is placed in fluid communication with piston chamber 50 and chamber 22 through bypass slot 38.

As indicated above, it may be desirable to determine the composition of the leaked fluid by obtaining a sample for testing. For this purpose a detection device generally indicated at 102 is removably threaded onto internally threaded female end 94 and receives the leaked fluid for determining the chemical composition thereof and particularly any hazardous chemical compositions.

Also, it may be desirable to inject a sealant into chamber 22 for minimizing or stopping the fluid leakage past lower end 22. For this purpose, a suitable sealant injection may be threaded onto inner body 94 in lieu of detector 100. Sealant from the injection passes through hollow rod 66 and slot 38 around piston 46 for injection into chamber 22.

Figure 6:
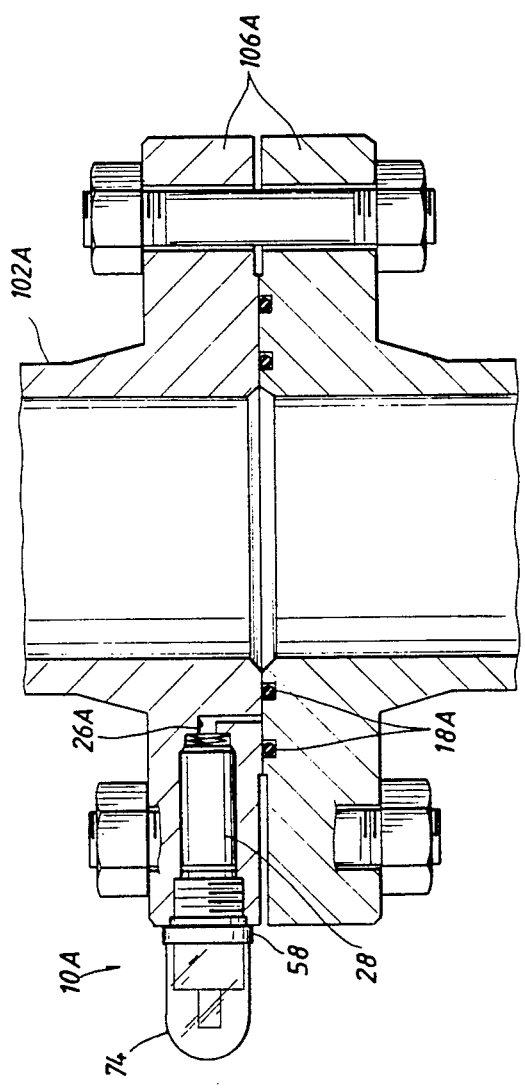
FIG. 6 is an elevation of the present invention shown installed on a flanged connection of a flow line and in fluid communication with the enclosed leakage chamber or space formed between two adjacent seals between opposed flanges of the flanged connection.

The present invention may be utilized with various types of flow lines and flow control devices where fluid leakage occurs into a space between two adjacent seals. For example, as shown in FIG. 6, an indicator device 10A similar to indicator device 10 shown in FIGS. 1-5 is mounted on a flanged flow line shown generally at 102A with a pair of annular seals 18A extending between abutting flanges 106A. A fluid passage 26A from the space between seals 18A extends through one flange 106A to provide fluid communication with fluid indicator device 10A as in the embodiment of FIGS. 1-5. A chemical detection device or sealant injection would also be utilized with indicator device 10A as described above for the embodiment of FIGS. 1-5.

It is noted that the present invention provides fluid access to piston chamber 50 and chamber 22 so that a leaked fluid may be drained from chamber 22 or a separate fluid, such as a sealant, may be injected into chamber 22, without any escape of fluid to the atmosphere. Thus, fluid is contained within the indicator device at all times during the operation of the present invention. Further, metal seals may be provided, if desired, so that the functioning of the invention will not be impaired in the event of fire or the deterioration of seals, such as elastomeric seals. Additionally, while the present invention has been illustrated in the drawings as utilizing a visual indicator, it is to be understood that the present invention could be utilized with other types of fluid pressure indicators, such as audible or electronic signals at a remote location, for example.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. Apparatus for detecting fluid leakage past a fluid seal into an enclosed leakage chamber sealed by said fluid seal and comprising:
    a fluid device having an inlet chamber in fluid communication with said leakage chamber and a piston in continuous fluid communication with fluid pressure in said inlet chamber adapted to be moved from a first normal set position to a second position upon the reaching of a predetermined fluid pressure in said inlet chamber to provide an indication of fluid leakage; and
    separate means selectively operable to provide fluid communication serially with said inlet chamber and said leakage chamber after movement of said piston to said second position thereby to permit direct fluid communication between said separate means and said inlet chamber, said separate means including means to move said piston to a third position to permit fluid to bypass said piston from said leakage chamber to said separate means.

2. Apparatus as set forth in claim 1 wherein a signal member is operatively connected to said piston for movement to a signal position upon movement of said piston to said second position at said predetermined fluid pressure.

3. Apparatus as set forth in claim 2 wherein said signal member comprises a rod-like member movable by said piston to a projected position for visual indication; and
    a removable transparent cover is provided over the projecting end of said rod-like member to permit the projected end of the signal member to be observed visually.

4. Apparatus as set forth in claim 3 wherein said projecting end of said rod-like member is of a predetermined bright color to facilitate visual recognition thereof when moved to a signal position with said projected end exposed.

5. Apparatus as set forth in claim 1 wherein said enclosed leakage chamber is provided between a pair of annular packing seals about a stem of a movable valve member in a valve.

6. Apparatus as set forth in claim 1 wherein said enclosed leakage chamber is provided between a pair of connected flanges of a flow line and a pair of spaced annular seals between said connected flanges.

7. Apparatus as set forth in claim 1 wherein said fluid device includes a generally cylindrical body defining a piston chamber in fluid communication with said leakage chamber and receiving said piston therein, and an elongate signal member in said body having one end operatively connected to said piston for movement therewith and having an opposite end adapted to project from an end of said body for visual observation upon movement of the piston to said second position at said predetermined fluid pressure.

8. Apparatus as set forth in claim 7 wherein
    a removable transparent cover is mounted over said end of said body to permit visual observation of the projecting end of said signal member at said predetermined fluid pressure.

9. Apparatus as set forth in claim 8 wherein
    said separate means includes a piston actuator adapted to be mounted on said body upon removal of said transparent cover, said piston actuator adapted to move said piston to a fluid bypass position to permit the flow of fluid between said piston chamber and said actuator.

10. Apparatus as set forth in claim 9 wherein a sealant injector is connected to said actuator for the injection of sealant into said piston chamber and said leakage chamber.

11. Apparatus as set forth in claim 9 wherein a detection device is connected to said actuator to receive fluid from said piston chamber and leakage chamber for testing.

12. Apparatus as set forth in claim 8 wherein said elongate signal member is movable between three positions; a first normal operating intermediate position, a second outwardly projected position in which said signal member is projected outwardly for visual observation, and a third inwardly retracted position in which said signal member is withdrawn within said cylindrical body;
    said signal member being movable manually to said third position from said second position upon removal of said removable cover.

13. Apparatus as set forth in claim 12 wherein said piston is movable with said elongate signal member to said first, second, and third positions thereof;
    means resiliently urge said piston and said elongate signal member to said normal operating intermediate position; and
    a fluid bypass passage is provided around said piston when said signal member and said piston are moved to said third retracted position for permitting the leaked fluid to bypass said piston and to be removed from said fluid device for inspection.

14. Apparatus for detecting fluid leakage as set forth in claim 12 wherein
    fluid inspection means are provided for said fluid for removable connection to said fluid device, said fluid inspection means being connected to said fluid device after fluid leakage is indicated by said fluid device.

15. Apparatus for detecting fluid leakage as set forth in claim 14 wherein said fluid inspection means includes means to remove a portion of the leaked fluid from said fluid device; and means to determine the composition of the leaked fluid removed from said fluid device.

16. A visual indicator device adapted to be connected in fluid communication with fluid leaked into an enclosed leakage chamber past a fluid seal; said visual indicator device comprising:

an elongate body having a central bore therethrough;

a fluid inlet chamber adjacent one end of said body adapted to be in fluid communication with said enclosed leakage chamber;

a piston mounted within said fluid inlet chamber; and an elongate rod-like signal member mounted in said bore for movement with said piston between three positions; a first normal operating position, a second fluid operated outwardly projected position in which said signal member is projected outwardly for visual observation, and a third manually operated position in which leaked fluid may bypass said piston.

17. A visual indicator device as set forth in claim 16 wherein a transparent end cover is removably mounted on the other end of said body adjacent an end of said signal member for the visual observation of the end of the signal member when in said second outwardly projected position.

18. A visual indicator device as set forth in claim 16 wherein said body has a piston chamber in which said piston is mounted for movement, and a fluid bypass passage is provided adjacent said piston chamber to permit leaked fluid from said inlet chamber to bypass said piston in said third manually operated position.

19. In combination, a fluid indicator device adapted to be connected in fluid communication with fluid leaked past a fluid seal into an enclosed leakage chamber;

a fluid inspection device adapted to be detachably connected to said fluid indicator device to receive therefrom fluid leaked into said enclosed leakage chamber;

said fluid indicator device comprising a body having a central bore therethrough, a fluid inlet chamber adjacent one end of said body in continuous fluid communication with said enclosed leakage chamber, a piston mounted within said fluid inlet chamber, and a signal member responsive to said piston mounted in said bore for movement with said piston between a first normal operating position and a second fluid operated signal position in which said signal member indicates an abnormal operation;

said fluid inspection device comprising fluid actuating means operable upon connection of said fluid inspection device to said indicator device to receive leaked fluid from said inlet chamber for inspection.

20. The combination set forth in claim 19 wherein said fluid indicator device has a transparent end cover removably mounted on the other end of said body adjacent an end of said signal member for the visual observation of the end of said signal member when in said signal position; and said fluid inspection device is removably connected to said other end of said visual indicator body upon removal of said transparent end cover.

21. A fluid inspection device adapted to be removably connected to a projecting end of a visual indicator device for leaked fluid upon removal of a transparent end cover to receive leaked fluid for inspection from a fluid inlet piston chamber having a reciprocable piston therein after a visual indication of fluid leakage by said indicator device; said fluid inspection device comprising:

an adaptor for threadedly engaging an end of said visual indicator device after removal of said transparent end cover; and a manually actuated piston actuating member effective upon manual actuation to move said piston to a fluid bypass position to permit flow of fluid from said inlet chamber to bypass said piston to said fluid inspection device.

22. A fluid inspection device as set forth in claim 21 wherein said piston actuating member comprises a projecting prong effective upon manual actuation to push said piston to the fluid bypass position.

23. In combination, a fluid indicator device adapted to be connected in fluid communication with fluid leaked past a fluid seal into an enclosed leakage chamber;

a sealant injector adapted to be detachably connected to said visual indicator device to inject sealant into said enclosed leakage chamber;

said fluid indicator device comprising a body having a central bore therethrough;

a fluid inlet chamber adjacent one end of said body adapted to be in fluid communication with said enclosed leakage chamber;

a piston mounted within said fluid inlet chamber;

means to move said piston to a bypass position to permit fluid to said fluid inlet chamber to bypass said piston; and a signal member responsive to said piston mounted in said bore for movement with said piston between a first normal operating position and a second fluid operated signal position in which said signal member indicates an abnormal operation;

said sealant injector comprising fluid actuating means operable upon connection of said sealant injector to said indicator device to inject sealant into said inlet chamber and said enclosed leakage chamber when said piston is in said bypass position.

24. The combination as set forth in claim 23 wherein said indicator device has a transparent end cover removably mounted on the other end of said body adjacent an end of said signal member for the visual observation of the end of said signal member when in said signal position; and said sealant injector is removably connected to said other end of said indicator body upon removal of said transparent end cover.

25. A method of visually detecting the presence of a fluid leaked into an area between two spaced seals and for determining the composition of the leaked fluid after visual detection; said method comprising the following steps:

providing a visual indicator device having a visually observable indicator member responsive to the leaked fluid;

providing fluid communication between the area between the two spaced seals and the visual indicator device to move the indicator member to a visually observable position upon the leakage of fluid into said area;

providing a fluid inspection device for detachable connection to said visual indicator device after the movement of said indicator member to said visually observable position;

manually permitting the flow of leaked fluid from said visual indicator device to said fluid inspection device; and determining the composition of said leaked fluid in said fluid inspection device.

26. The method as set forth in claim 25 further including the steps of providing the indicator device with a fluid inlet chamber in continuous communication with said enclosed leakage chamber and providing a reciprocable piston in said fluid inlet chamber for the leaked fluid in said visual indicator device; and manually moving said piston to a fluid bypass position when said fluid inspection device is connected to said visual indicator device to permit the flow of fluid past said piston to said fluid inspection device.

27. A method of detecting the presence of a fluid leaked into an enclosed leakage chamber past a seal and for injecting a sealant into the enclosed leakage chamber for minimizing fluid leakage; said method comprising the following steps:

providing a fluid indicator device having a signal member responsive to leaked fluid;

providing fluid communication between the enclosed leakage chamber and the signal member to move the signal member to a position for indicating fluid leakage;

providing a sealant injector for detachable connection to said fluid indicator device after the movement of said signal member to the position indicating fluid leakage;

manually moving said signal member to a position to permit fluid communication between said sealant injector and said enclosed leakage chamber; and providing sealant from said sealant injector to said enclosed leakage chamber to minimize leakage of fluid thereat.

28. The method as set forth in claim 27 further including the steps of providing the fluid indicator device with a fluid inlet chamber in continuous communication with said enclosed leakage chamber and providing a reciprocable piston in said inlet chamber for the leaked fluid; and manually moving said piston to a fluid bypass position when said sealant injector is connected to said fluid indicator device to permit the flow of sealant past said piston to said fluid inlet chamber and said enclosed leakage chamber.

29. A visual indicator device adapted to be connected in fluid communication with fluid leaked into an enclosed leakage chamber past a fluid seal; said visual indicator device comprising:

an elongate body having a central bore therethrough;

a fluid inlet chamber adjacent one end of said body adapted to be in fluid communication with said enclosed leakage chamber;

a piston mounted within said fluid inlet chamber; and an elongated rod-like signal member mounted in said bore for movement with said piston between three positions; a first normal operating position, a second fluid operated outwardly projected position in which said signal member is projected outwardly for visual observation, and a third manually operated position in which leaked fluid may bypass said piston;

said body having a piston chamber in which said piston is mounted for movement, and a fluid bypass passage adjacent said piston chamber to permit leaked fluid from said inlet chamber to bypass said piston in said third manually operated position, said rod-like signal member having a central bore to receive leaked fluid from said inlet chamber bypassing said piston in said third manually operated position.

30. A visual indicator device as set forth in claim 29 wherein one end of said signal member is adapted for detachable connection to a fluid inspection device for receiving fluid from said central bore of said signal member leaked around said piston in said third manually operated position.

31. In combination, a fluid indicator device adapted to be connected in fluid communication with fluid leaked past a fluid seal into an enclosed leakage chamber;

a fluid inspection device adapted to be detachably connected to said fluid indicator device to receive therefrom fluid leaked into said enclosed leakage chamber;

said fluid indicator device comprising a body having a central bore therethrough, a fluid inlet chamber adjacent one end of said body in continuous fluid communication with said enclosed leakage chamber, a piston mounted within said fluid inlet chamber, and a signal member responsive to said piston mounted in said bore for movement with said piston between a first normal operating position and a second fluid operated signal position in which said signal member indicates an abnormal operation;

said fluid inspection device comprising fluid actuating means operable upon connection of said fluid inspection device to said indicator device to receive leaked fluid from said inlet chamber for inspection;

said body having a piston chamber in which said piston is mounted for movement and a fluid bypass passage adjacent said piston chamber to permit leaked fluid from said inlet chamber to bypass said piston upon movement of said piston to a third manually operated position; and said fluid actuating means upon manual connection of said fluid inspection means to said fluid indicator device moving said piston to said third manually operated position to receive fluid through said fluid bypass passage for inspection by said fluid inspection device.

* * * * *